(12) United States Patent
Zheng

(10) Patent No.: US 7,737,633 B2
(45) Date of Patent: Jun. 15, 2010

(54) ELECTROLUMINESCENT WIRE

(76) Inventor: Yan Zheng, No. 139, Lane 3740, Hua Ning Road, Xin zhuang Industrial Zone, Minhang District, Shanghai (CN) 201108

( * ) Notice: Subject to any disclaimer, the term of this patent is extended or adjusted under 35 U.S.C. 154(b) by 300 days.

(21) Appl. No.: 11/628,816

(22) PCT Filed: Dec. 6, 2005

(86) PCT No.: PCT/CN2005/002102

§ 371 (c)(1), (2), (4) Date: Dec. 7, 2006

(87) PCT Pub. No.: WO2006/069517

PCT Pub. Date: Jul. 6, 2006

(65) Prior Publication Data

US 2008/0036375 A1    Feb. 14, 2008

(30) Foreign Application Priority Data

Dec. 29, 2004    (CN) .................. 2004 1 0099233

(51) Int. Cl.
*H01J 1/62* (2006.01)

(52) U.S. Cl. .................. 313/509; 313/506; 313/511

(58) Field of Classification Search .................. None
See application file for complete search history.

(56) References Cited

U.S. PATENT DOCUMENTS

| | | | | | |
|---|---|---|---|---|---|
| 3,069,579 | A | * | 12/1962 | Berg et al. | 313/511 |
| 3,348,056 | A | * | 10/1967 | Kohashi | 250/214 LA |
| 5,876,863 | A | * | 3/1999 | Feldman et al. | 428/690 |
| 6,004,686 | A | * | 12/1999 | Rasmussen et al. | 428/690 |
| 6,538,375 | B1 | * | 3/2003 | Duggal et al. | 313/506 |
| 2004/0212301 | A1 | * | 10/2004 | Duggal et al. | 313/511 |
| 2007/0049485 | A1 | * | 3/2007 | Tanabe et al. | 501/136 |
| 2008/0265767 | A1 | * | 10/2008 | Baumberg et al. | 313/511 |

FOREIGN PATENT DOCUMENTS

| WO | WO 2005093763 A1 | * | 10/2005 |
|---|---|---|---|
| WO | WO 2007004223 A2 | * | 1/2007 |

* cited by examiner

*Primary Examiner*—Peter J Macchiarolo
*Assistant Examiner*—Donald L Raleigh

(57) ABSTRACT

An electroluminescent wire includes a continuous base wire, plated with a metal modified layer. The metal wire is coated with a dielectric layer. The dielectric layer is coated with a luminous layer made of electroluminescent powder added with YAG to emit light. The luminous layer is coated with a transparent conductive layer. The surface of the conductive layer connects to 1 to 4 protective conductive wires, and all are enclosed by a fluoroplastics layer. The fluoroplastics layer is enclosed by a plurality of transparent and translucent colorized plastic tubes. Fluorescent dye or paint and scattering agent or glass microballons are added into at least one layer of the plastic tubes respectively. AC is applied between the metal modified layer and outer protective conductive wire.

2 Claims, 8 Drawing Sheets

ELECTROLUMINESCENT WIRE

BACKGROUND OF THE PRESENT INVENTION

1. Field of Invention

The present invention relates to a kind of luminous display device, and more particularly, relates to an electroluminescent wire which utilizes electric field for light emitting purposes.

2. Description of Related Arts

Theoretically, an electroluminescent wire has the same luminous principle compared with the powder electroluminescent device, wherein the electroluminescent material is mainly the luminous material of II to VI groups. The luminous material will emit composite lights in the electric field. Furthermore, the luminous material consists of microcrystalline powder of 5 to 30 micron, in which a quantity of emitting line pairs existed so as to ensure the light emitting in the evenly distributed electric field.

U.S. Pat. Nos. 5,485,355, 5,869,930, 6,400,093, EP0693803A, JP7-235375, CN ZL01250547.1, and CN ZL01251151.X respectively described the structure of the electroluminescent devices, wherein the metal wire is exclusively used a base wire, durable moisture-proof green luminous material is used as light emitting material, ITO material is used as the transparent conductive layer, PVC plastic is used as sealing layer, and colorized organic fluorescer are used for coloring purposes. U.S. Pat. Nos. 4,585,673, 5,156,885, and ZL01138921.4 also disclosed complex wrapping techniques for luminous material in the electroluminescent wire.

More or less, the luminous wires disclosed by prior arts have the following drawbacks:

A) The electroluminescent wire cannot be used independently for light emitting purposes. For example, it must be mounted or embedded into a certain surface. That is to say, it needs a groove, clip, glue, or bracket for positioning purposes. This greatly limits its application in all perspectives.

B) The white light is realized by adding pink organic dye into electroluminescent powder. However, such method is not stable, and the final product is short-lived. What is worse, the color purity is not well. Whenever the electroluminescent wire was exposed outside for 10 days or continuously being performed over 100 hours, the organic dye would have been fade, thus resulting white light changed into green or light blue, and leading other colors changed.

C) Due to the fact that PVC or PE is used as sealing material, the moisture-proof and durability function would not be guaranteed. As a result, the moisture-proof green luminous material, having a longer life span have to be used thus causing the overall costs of the luminous wire unnecessarily increased and manufacturing procedure complicated.

D) Since the transparent conductive layer uses ITO making of $In_2O_3$ and its dopant, its cost would be rather expensive and susceptible under bad weather. Therefore, such luminous wires are always kept within a low temperature refrigerator for maintaining a relatively short three-month storage life span.

E) The weight and hardness of the base wire would limit the applications of such luminous wires.

The present inventor has improved the durability, color stability, and structure of the electroluminescent wire for several times respectively in Chinese patents CN96118930.4, 98122739.2, 0018424.5, 01133342.1. However, the shortcomings of the traditional luminous wires still existed. For instances, the manufacturing process is still complex and the adhesion between the dielectric layer and the luminous layer is still weak. That is to say, the improved procedure is still not suitable for mass production. On the other hand, the life span of the improved luminous wires is not stable, and such product is still from independent usage.

SUMMARY OF THE PRESENT INVENTION

A primary object of the invention is to produce an electroluminescent wire which is capable of overcoming the above mentioned shortcomings.

In order to achieve the object, the present invention provides an electroluminescent wire, comprising:

a continuous base wire having a surface;

a metal layer coating onto the surface;

a dielectric layer coating onto the metal layer;

a luminous layer coating onto the dielectric layer, wherein the luminous layer is prepared with electroluminescent powder added with YAG for light emitting purpose;

a transparent conductive layer coating onto the luminous layer, wherein the transparent conductive layer is connected to a plurality of the transparent conductive layer and is sealed by fluoroplastics;

an outermost layer made of a plurality of transparent and translucent colorized plastic tubes, enclosing the transparent conductive layer, a continuous metal wire embedded into the wire body;

a violet proof agent added into the wire body;

a fluorescent dye or paint and scattering agent or glass microballons added into at least one layer of the plastic tubes respectively, wherein AC power is applied between the metal modified layer and outer protective conductive wire.

In the present invention, the continuous base wire can be applied as bendable solid or hollow tube or wire made of plastic, rubber, or metal wire. The metal modified layer can be selected from a group consisting of gold, silver, copper, aluminum and stannum. The dielectric layer is a compound of dielectric powder and dielectric colloid evenly coating on the metal modified layer. The dielectric powder is selected from a group consisting of TiO2, BaTiO3, PbTiO3, and SrTiO3. The colloid is selected from a group consisting of epoxy resin, acrylic derivative, Cyanoethyl Sugar, Cyanoethyl Aethe, Cyanoethyl Cellulose that can be added with polyester, polyurethane, etc. The mixing ratio of the dielectric powder and the colloid is 1:1 to 1:2 by weight. A kind of coupling agent containing silicon or titanic is added into the dielectric layer, and the weight of the added coupling agent is about the 5% to 20% of the weight of the luminescent powder. Yttrium Aluminitum Garnel (YAG) is added into the luminescent powder, and the weight of the added YAG is about the 5% to 30% of the weight of the luminescent powder. The transparent conductive layer is made of ATO, which is a compound of the conductive nanometer metal oxide, containing one or more metal oxide of Sn, Sb, and Zn, and cement. The outer surface or the transparent conductive layer connects to the 1 to 4 outer protective conductive wires that are independent and evenly distributed. The protective conductive wire is made of metal wire having conductivity and flexibility, and can be coated with a metal modified layer made of anyone of the gold, silver, copper, aluminum, and stannum. The fluoroplastics is transparent, and enclosed by a plurality of transparent or translucent colorized plastic tubes. A continuous metal wire with hardness, ultra ultraviolet screening agent, and scattering agent or glass microballons are added in at least one layer of the plastic tubes respectively. The protective conductive wire can be coated with a well reflective layer, and can not rebound after bending. The protective conductive wires are enclosed by plastic tubes too. The colorized plastic tube also can be enclosed by a plastic enclosed tube made of transparent or translucent plastic. The shape of the plastic enclosed tube can be rectangular, circle, semicircle or a shape with a projecting frame.

DETAILED DESCRIPTION OF THE PREFERRED EMBODIMENT

Figure 1:
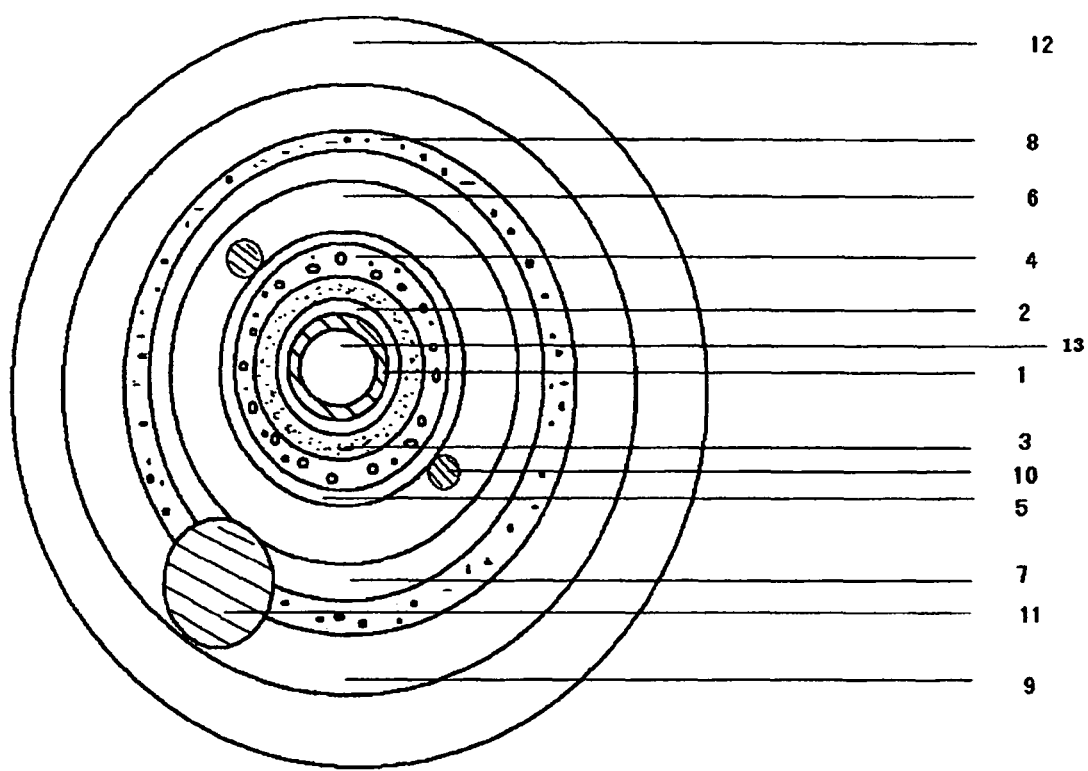
FIG. 1 is a cross-sectional schematic view of the electroluminescent wire having tube structure according to the preferred embodiment of the present invention.

Referring to FIG. 1, the electroluminescent wire of the present invention comprises a continuous base wire 1, plated with a metal modified layer 2. The metal modified layer 2 is coated with a dielectric layer 3. The dielectric layer 3 is coated with a luminous layer 4 made of an electroluminescent material of one or more colors. The luminous layer 4 is coated with a transparent conductive layer 5, which is connected with 1 to 4 outer protective conductive wires 10. The outermost layer is sealed by a plurality of transparent or translucent plastic tubes 6-9, wherein the innermost layer 6 is prepared by fluoroplastics. It is noted that fluorescent dye or paint is added into at least one layer of the plastic tubes 7 to 9. A continuous metal wire 11 with a predetermined hardness is inserted into at least one layer among the plastic tubes 7 to 9, and the surface of the metal wire has a predetermined brightness that can increase the luminescent intensity by over 20%. The scattering agent or glass microballons are added into at least one layer among the plastic tubes 7 to 9 for improving the visual luminescent intensity to an extent of 10%.

According to the preferred embodiment of the present invention, the base wire 1 of can be applied as solid (as shown in FIG. 2 to FIG. 5) or hollow (as shown in FIG. 1) flexible tube or wire made of plastic, rubber or metal, such as PVC, PE, copper, aluminum, iron, etc. The surface of the base wire should be smooth and compact, and the cross-section of the base wire can be round, rectangular, and so on. It is noted that the round shape is preferable for mass production. Furthermore, the material of the base wire, such as plastic, rubber or metal should be weather proof and tension resistible. That is to say, the base wire would not be deformed under undesirable condition, such as temperature 120 centigrade or in a state of tension. The hollow tube or wire can be filled with solid or liquid, so that it can be used in various applications. The thickness or diameter of the base wire is about 0.2 mm to 4 mm, wherein 0.5 mm to 1 mm is better.

The base wire 1 is plated with a metal modified layer 2 to level up the roughness and cracks on the surface of the base wire 1, so that the dielectric layer 3 can be substantially cemented to the surface of the metal modified layer 2. The metal of the metal modified layer 2 can be selected from gold, silver, copper, aluminum, or stannum. The metal modified layer 2 should be flexible and of good conductivity. The metal modified layer 2 can be plated or coated on the base wire 1. The metal modified layer 2 also can improve the reflectivity to raise the luminescent intensity by 10% to 30%. Generally, the thorn and cracks are unavoidable on the surface of the metal. When coated with Sn, the smoothness, rigidity and bending resistance of the base wire would be increased by 20%. The thickness of the metal modified layer 2 is about 0.05 mm to 0.3 mm, wherein 0.1 mm is better.

The outer surface of metal modified layer 2 is coated with a dielectric layer 3 made of a compound of dielectric powder and colloid. The dielectric powder should have a high dielectric coefficient. The dielectric powder can be selected from a group consisting of $TiO_2$, $BaTiO_3$, $PbTiO_3$ and $SrTiO_3$. The colloid is selected from a group consisting of epoxy resin, acrylic derivative, Cyanoethyl Sugar, Cyanoethyl Aethe, Cyanoethyl Cellulose that can be added with polyester, polyurethane, etc. The mixing ratio of the dielectric powder and the dielectric colloid is 1:1 to 1:2 by weight, wherein 1:1 is preferable. Further more, a kind of coupling agent containing silicon or titanic such as silane is added into the dielectric layer. The coupling agent can improve the adhesion and flexibility of the surface of the conductive metal modified layer. The weight of the added coupling agent is about the 5% to 20% of the weight of the luminescent powder. The thickness of the dielectric layer is about 0.05 mm to 0.1 mm, wherein 0.08 mm to 0.1 mm is better.

The outer surface of the dielectric layer is evenly coated with a luminous layer 4, which is made of a compound of electroluminescent powder and electroluminescent colloid. One or more kind of electroluminescent powder can be used such as ZnS and Cu. The various luminous colors can be displayed by mixing the different colors of the luminous materials. The mixture of 5% to 30% Yttrium Aluminitum Garnel (YAG) and blue-green eletroluminesent powder will emit white light. The main ingredients of YAF are inorganic compound luminous material consisting ceria mixed with yttria and alumina (CN 00104438.9). When excited by the blue or blue-green eletroluminesent materials, the YAG will emit light of 550 m to 600 m. The YAG absorbing light of 440 m to 520 m can extend the life of white light, which is 40 times the life of the organic fluorescent material, especially in the atrocious weather such as insulation, humidity, etc. When used with organic fluorescent dye at the same time, the YAG can keep the above character. The electroluminescent colloid is one or more of epoxy resin, acrylic derivative, Cyanoethyl Sugar, Cyanoethyl Aethe, Cyanoethyl Cellulose, and polyester. The mixing ratio of the electroluminescent powder and the electroluminescent colloid is 1:1 to 1:2 by weight, wherein 1:1 is preferable. Further more, the coupling agent containing silicon and titanic is added into the luminous layer. The coupling agent can improve the adhesion and flexibility of the surface of the dielectric layer. The weight of the added coupling agent is about the 5% to 20% of the weight of the luminescent powder. The thickness of the luminous layer is about 0.05 mm to 0.2 mm, wherein 0.08 mm to 0.2 mm is preferable.

The outer surface of the luminous layer is evenly coated with a transparent conductive layer 5. The transparent conductive layer 5 is composed of conductive nanometer metal oxide and coupling agent, wherein the metal oxide contains one or more metal oxide of Sn, Sb, and Zn, such as conductive ATO nanometer metal oxide containing $Sb_2O_3$ mixed with $SnO_2$ and ZnO of 70 nm to 80 nm diameter, and the coupling agent could be applied as alcohols such as ethanol. The ratio of the two components is determined according to the viscosity. The thickness of the transparent conductive layer is 0.01 mm to 0.05 mm, wherein 0.02 mm to 0.04 mm is better. The conductive nanometer metal oxide is capable of shortening the production process and time, and lowering the cost by 50% comparing to the method of plating in the relative vacuum or using ITO.

The outer surface of the transparent conductive layer 5 is connected with 1 to 4 protective conductive wires 10. The 1 to 4 protective conductive wires should be distributed on the surface of the transparent conductive layer 5 separately and evenly. The protective conductive wire is composed of metal wire such as copper, aluminum, silver, gold and so on, which has good conductivity and flexibleness. The surface of the protective conductive wire is plated or coated with a metal modified layer, which should have good continuous conductivity, and can be bent. The metal used in the above metal modified layer can be selected from gold, silver, copper, aluminum and stannum. The metal modified layer can ensure the continuous operating of the transparent conductive layer, and reduce its resistance. The thickness of the protective conductive layer is about 0.05 mm to 0.3 mm, wherein 0.1 mm is better.

Figure 8:
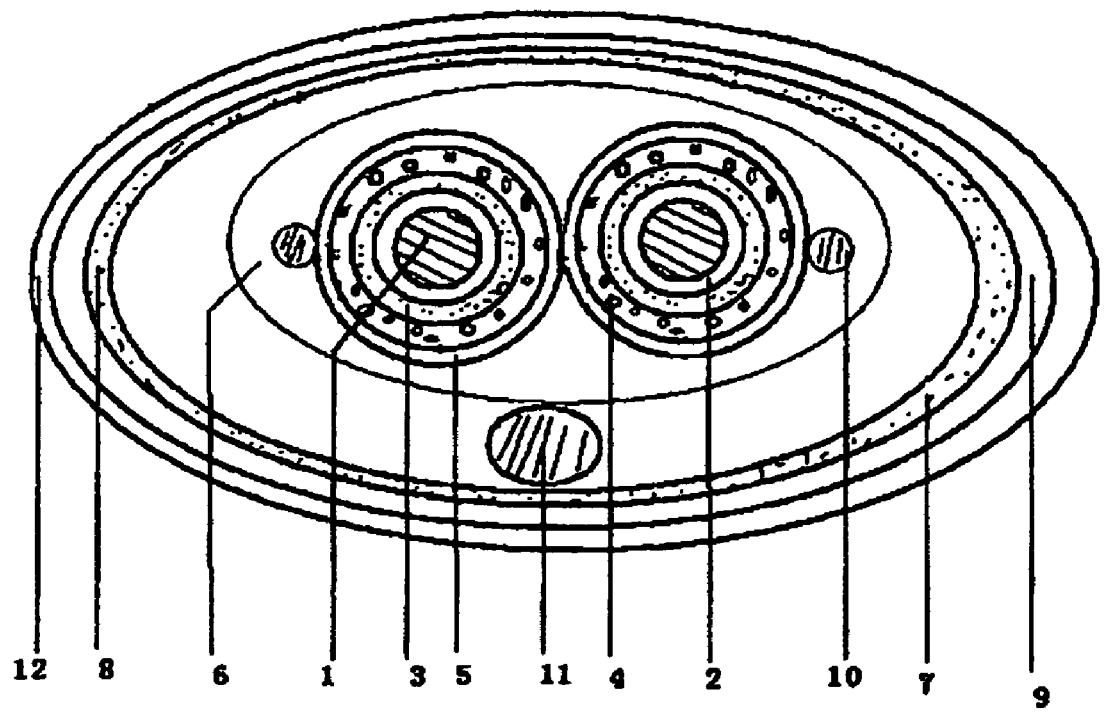
FIG. 8 is the cross-sectional schematic view of the electroluminescent wire with double-wire structure according to the preferred embodiment of the present invention.

Or otherwise, two luminous wires can also be placed closely side by side, as shown in FIG. 8. In practice, two input electrodes are respectively connected to different base wire to achieve the same luminous effect. It is noted that the outer protective conductive wires is not necessary, only for binding reinforcement function.

The above layers are covered with a plurality of plastic layers, wherein the inner layer is made of compact and transparent fluoroplastics layer 6 for directly protecting transparent conductive layer and conductive wire. Since humidity would cause the aging process of the EL luminous materials, the fluoroplastics is applied in the present invention. This is due to the fact that fluoroplastics has excellent compactness so as to effective prevent the water molecule from passing through. On the other hand, the fluoroplastics also has better high temperature resistance, high pressure resistance, and humidity resistance in comparison with PVC and PE. Meanwhile, the security and lifespan of such luminous wire could be increased 3-5 times.

The fluoroplastics is enclosed by the transparent or translucent colorized plastic layer 7 prepared by PVC, PE, PTE, nylon, and so on. The fluorescent dye or paint can be added into the plastic layer 7 to help emit colorized light. 0.05% to 1% fluorescent dye or paint added into the plastic layer 7. The colorized plastic layer is thin, so the luminescent intensity is high. The outer layer of the colorized plastic layer 7 is ultraviolet protection layer 8, which is made of PVC added with ultraviolet screening agent to prevent the damage of the ultraviolet to the fluorescent dye or paint, and prolong the life of the color. Especially it can prolong 4 times as the life of red color. Transparent nylon can absorb humidity, and prolong the lift of electroluminescent wire. The outermost layer is plastic protective layer 9 made of colorless transparent PVC.

1% to 10% scattering agent or glass microballons can be added into the layer 9, wherein the diameter of the glass microballons should be less than 1 mm. The scattering agent or glass microballons can raise the visual luminescent intensity and homogeneity degree by over 10%, prolong the outdoor life by 20%, protect the entire electroluminescent wire, and increase the visual width. The luminous wire core can emit various colors light in one plastic protective layer using this technique.

Transparent nylon derivative that can absorb humidity such as nylon can be used between the above layers, which can prolong the life of the electroluminescent wire.

A continuous metal wire 11 with hardness is inserted into at least one layer among the plastic tubes 7 to 9. The metal wire 11 should be completely enwrapped by the plastic. The metal wire 11 can be copper, aluminum, or iron, whose surface should be coated with materials with good reflectivity, such as Zn, Sn, or with white paint. The diameter of the metal wire is comparative same with the diameter of the luminous wire core. The metal wire does not block the light emitted by the luminous wire core, and can increase the luminescent intensity by reflecting the light. The metal wire can support the electroluminescent wire, and make the electroluminescent wire can not rebound itself after bending. The metal wire can raise the luminescent intensity by 20% to 50%. The metal wire distributed in one plastic layer has the same effect as in a plurality layers. The machine of extruding a plurality wires can produce many plastic layers and metal wire at one time, and make the metal wire distributed in many plastic layers as shown in FIG. 1. The machine of extruding one wire can finish the job at several times, and make metal wire distributed in one plastic layer as shown in FIG. 1. The luminous wire core can also reel around the metal wire, and be covered using the plastic extruding machine.

Figure 2:
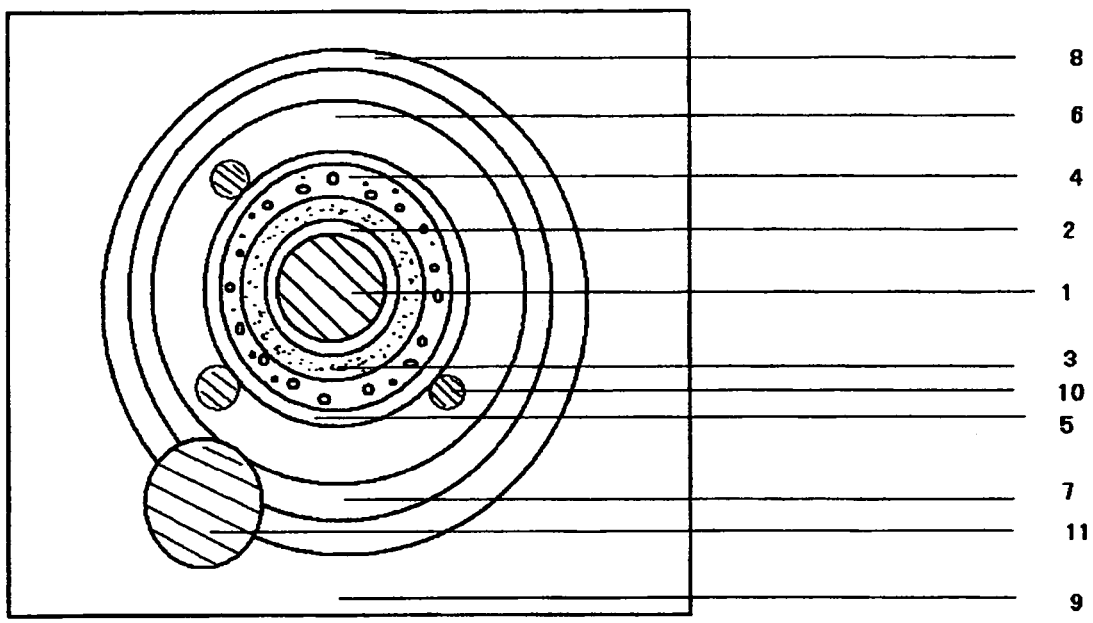
FIG. 2 is a cross-sectional schematic view of the electroluminescent wire having rectangular shape according to the preferred embodiment of the present invention.
Figure 3:
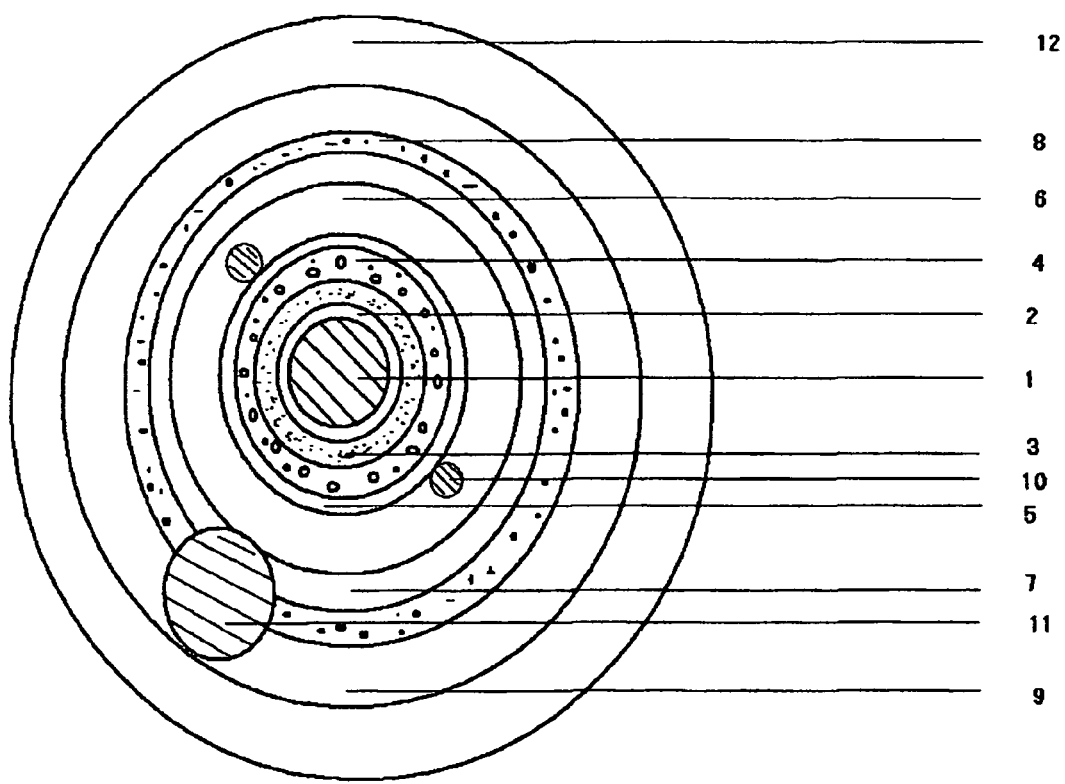
FIG. 3 is a cross-sectional schematic view of the electroluminescent wire having circular shape structure according to the preferred embodiment of the present invention.
Figure 5:
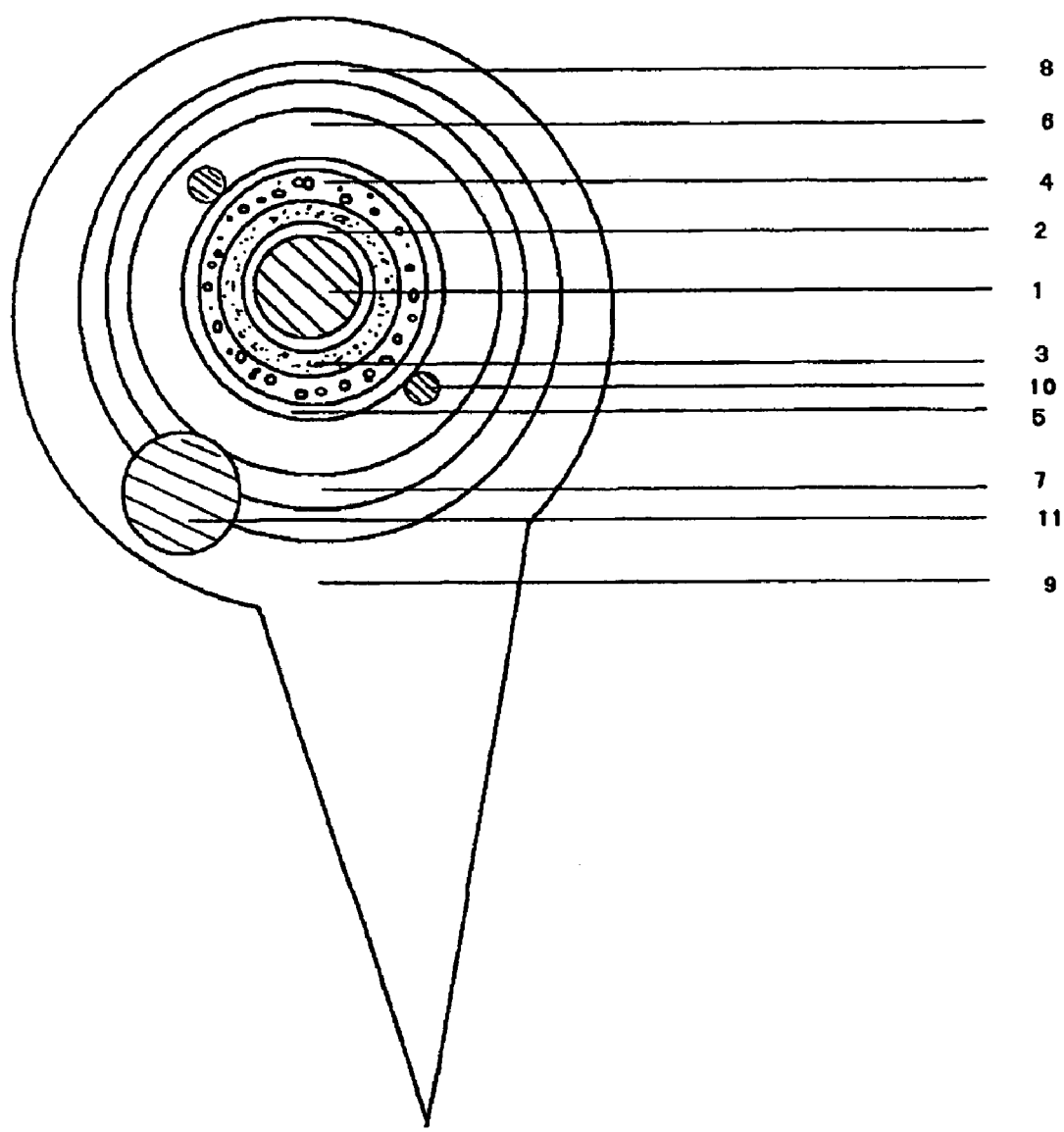
FIG. 5 is a cross-sectional schematic view of the electroluminescent wire with projecting frame according to the preferred embodiment of the present invention.
Figure 6:
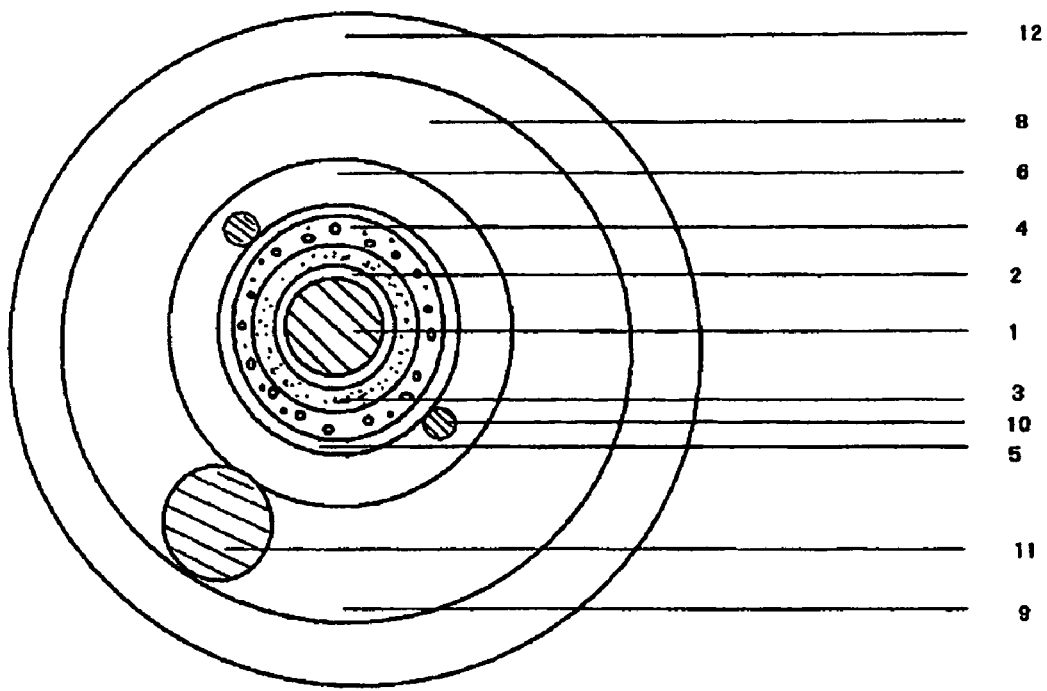
FIG. 6 is the cross-sectional schematic view of the electroluminescent wire with mixed circular structure according to the preferred embodiment of the present invention.
Figure 7:
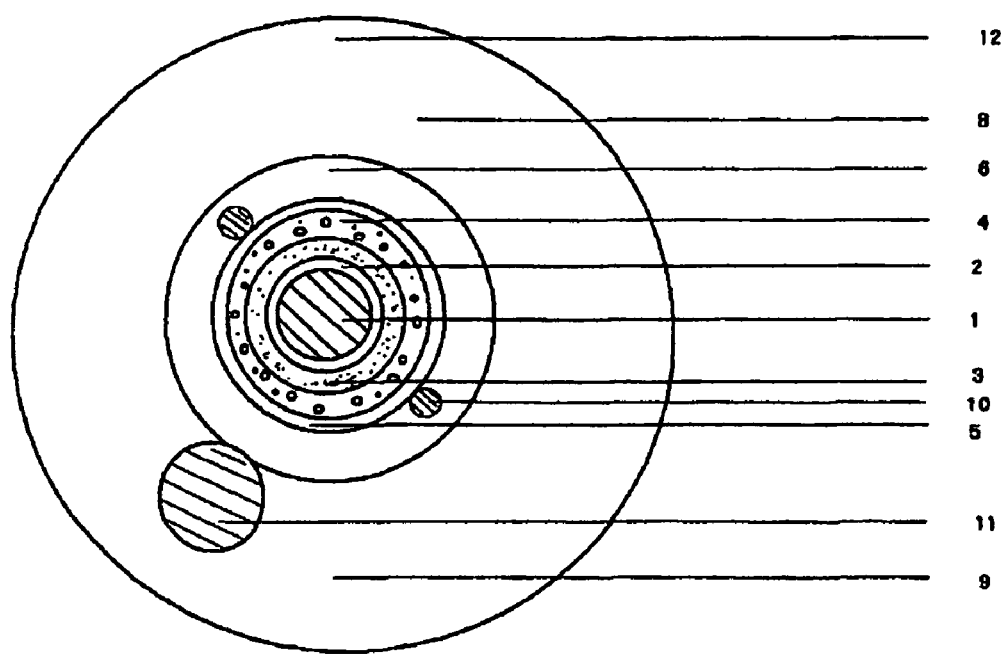
FIG. 7 is the cross-sectional schematic view of the electroluminescent wire with mixed structure according to the preferred embodiment of the present invention.

The above plastic layers can be enclose by the plastic enclosed tube 12 made of transparent or translucent plastic such as PVC or PE. The above paint, ultraviolet screening agent, scattering agent or metal wire can be added into one plastic layer to simplify the process as shown in FIG. 6 and FIG. 7. The plastic enclosed tube can be rectangular as shown in FIG. 2 for easy installation, circle as shown in FIG. 3 for easy bending, semicircle for the refraction effect, and shape with projecting frame as shown in FIG. 5 for sewing with the surface and edge of various clothes.

The outermost layer can use transparent plastic enclosed tube 12 with colorized fluorescence to make the same electroluminescent wire emit light of various colors. The pattern and color can be added or changed according to the demand, which is suitable for the toys and adornment.

The thickness of the above plastic layer 6, 7 to 9, and 12 is up to about 0.3 mm to 1 mm, wherein 0.5 mm to 0.8 mm is better. The thickness of the electroluminescent wire is from 3 mm up to 12 mm.

Figure 4:
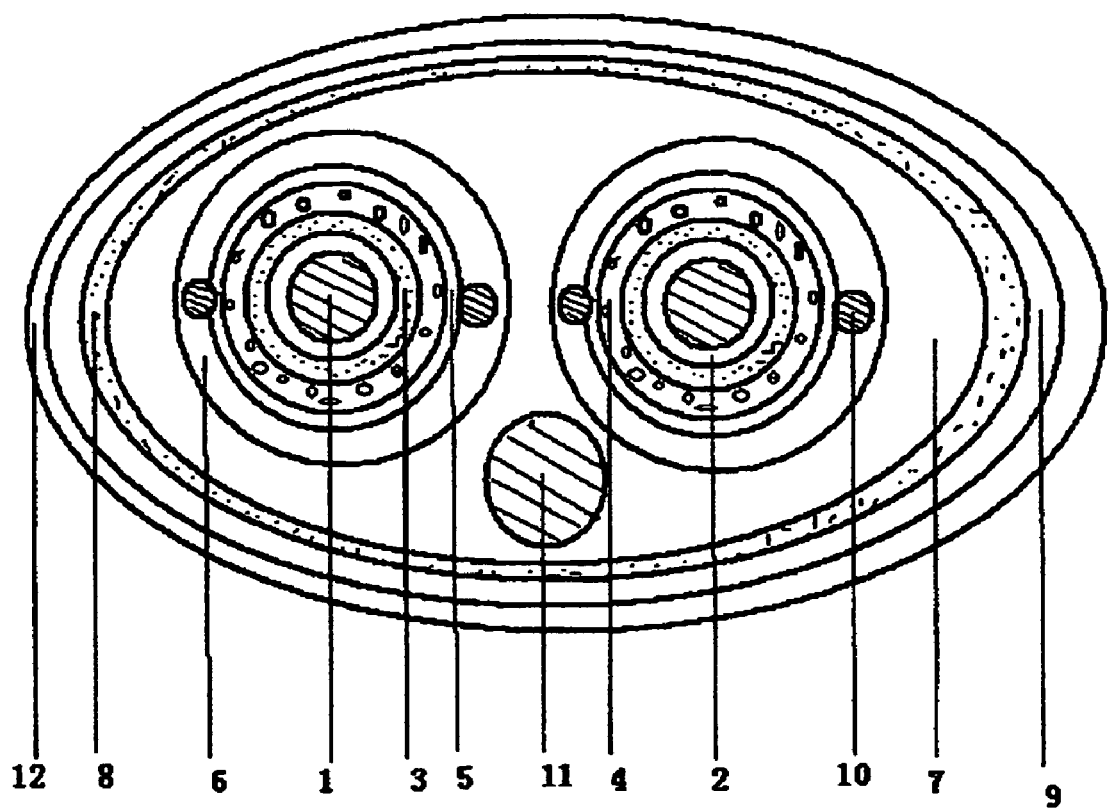
FIG. 4 is a cross-sectional schematic view of the electroluminescent wire having two-core shape structure according to the preferred embodiment of the present invention.

To improve the luminescent intensity, two or three luminous wire core can be used in one electroluminescent wire as shown in FIG. 4.

While using, AC is applied between the metal modified layer 2 and the transparent protective wire 10, wherein the voltage is 30 to 220 V of 50 to 4000 Hz. The luminescent intensity is 100 $Cd/m^2$ to 180 $Cd/m^2$, and the life is 3000 to 20000 hours. The electroluminescent wire can emit light, when the input power is 0.3 W/m to 0.7 W/m.

The electroluminescent wire of the present invention can be used in various applications at night, such as outdoor advertising, word pattern, sign panel; shop window, door, furniture, wall, roof, plant; the decoration on the vehicle, ship, and so on; indoor and outdoor decoration, instrument display, digital display; security marker and indicator; stairs, passage, door plate, exit, temporary outdoor dangerous field, safety guards marker, and so on. In addition, it can also be used for toys, industrial art, article for sports, dresses, Christmas luminous adornment, electric appliance, house fitment, military equipment, and so on.

Comparing to the prior art, the present invention has the following advantages:

A) The metal wire 11 as a support wire can be bent into various shapes, and the luminescent intensity increases by 20% by reflecting.

B) The mixture of YAG and blue eletroluminesent powder will emit white light, which has 40 times the endurance life of organic dye. Further more, the coupling agent raise the adhesion and flexibility by adding silicon and titanic into it. The purity of color is better than the prior art.

C) The fluoroplastics layer 6 increases the product life by 3 to 5 times. The life of the electroluminescent wire using non-wrapping electroluminescent powder is 3000 to 5000 hours, and the life warping electroluminescent powder is 10000 to 20000 hours in the condition of the 65% humidity, 110 V, and 2000 Hz. In addition, the fluoroplastics can resist the temperature up to 400° C., which is better than PVC and PE that can resist the temperature up to 200° C. The plastic layers use ultraviolet screening agent to prolong the life of the color, especially the red color. The scattering agent or glass microballons can increase the visual luminescent intensity and homogeneity degree.

D) The conductive layer 5 uses ATO, which has the advantages of simple process, stable, good resistance to atrocious weather, and low cost that is only one tenth of the prior art.

E) The automatic coating method is used in the embodiment of the present invention.

F) The metal modified layer 2 levels up the roughness and cracks on the surface of the base wire brought during the production. The metal layer can increase the luminescent intensity, and improve the adhesion of dielectric layer. The base wire can be non-metal or hollow tube, which enlarges the serviceable range of the product, such as on the nonplanar and the surface of the protruding solid.

The present invention are further illustrated in the following embodiments, but not limited to these. The chemical medicines in the following embodiments are available from the market.

The Preferred Embodiment 1

A continuous base line made of copper with the diameter of 0.5 mm. The surface of the base wire is plated with a metal modified layer 2 made of Sn. The metal modified layer is evenly coated with a dielectric layer 3 made of a compound of the dielectric powder and dielectric colloid, wherein the dielectric powder is one or more of barium titanate, and the dielectric colloid is one or more of epoxy resin, Cyanoethyl Sugar, Cyanoethyl Cellulose, and dimethyl formamide diluent agent. The coupling agent of titanic that is 5% of the electroluminescent powder by weight is added into the dielectric colloid. The weight ratio of the dielectric powder and the dielectric colloid is 1:1. The dielectric layer after coating solidifies below 110° C., and the thickness of the dielectric layer is less than 0.2 mm. The dielectric layer 3 is coated with a luminous layer 4, which is a compound of electroluminescent powder and electroluminescent colloid. The electroluminescent powder is blue-green ZnS:Cu added with YAG. The weight of YAG is 5% the weight of the electroluminescent powder. The electroluminescent colloid is a compound of the epoxy resin, ethlenediamine solidified agent, Cyanoethyl Sugar, Cyanoethyl Aethe, Cyanoethyl Cellulose, dimethyl formamide diluent agent. Silane as coupling agent is added into the electroluminescent colloid, and the weight of the silane is 10% of the weight of the electroluminescent powder. The weight ratio of the electroluminescent powder and the electroluminescent colloid is 1:2. The luminous layer after coating solidifies below 110° C. The luminous layer 4 is coated with a transparent conductive layer 5 made of an ATO compound and ethanol. The weight ratio of the ATO compound and ethanol is 100:5. The conductive layer solidifies below 100° C. after coating on the luminous layer. The outer protective conductive wire 10 is copper wire of 0.1 mm diameter plated with a metal modified layer made of Sn. The plastic layer 6 is colorless transparent fluoroplastics made by plastic extruding machine. The outer layer of plastic layer 6 is PVC layer 7 added with 0.3% fluorescent red dye, and accompanied with an iron wire 11 of 1 mm diameter plated with Zn. The plastic layer 8 is added with ultraviolet screening agent. The plastic layer 9 is added with the scattering agent. The total thickness of the electroluminescent wire is 5.0 mm to 7.0 mm.

The above electroluminescent wire emits red light under the voltage of 110V and the frequency of 2000 Hz.

The Preferred Embodiment 2

A continuous base line made of hollow plastic tube of 1.0 mm diameter. The surface of the base wire is plated with metal modified layer 2 made of Ag. The metal modified layer is evenly coated with the dielectric layer 3 made of a compound of the dielectric powder and dielectric colloid, wherein the dielectric powder is 1:1 compound of titania and lead titanate, and the dielectric colloid are epoxy resin, Cyanoethyl Sugar, Cyanoethyl Cellulose. The coupling agent of silicon that is 7% of the electroluminescent powder by weight is added into the dielectric colloid. The weight ratio of the dielectric powder and the dielectric colloid is 1:1. The dielectric layer after coating solidifies below 110° C., and the thickness of the dielectric layer is less than 1 mm. The dielectric layer 3 is coated with luminous layer 4, which is a compound of the electroluminescent powder and the electroluminescent colloid. The electroluminescent powder is blue-green ZnS:Cu added with YAG. The weight of YAG is 20% the weight of the electroluminescent powder. The electroluminescent colloid is a compound of the epoxy resin, ethlenediamine solidified agent, Cyanoethyl Sugar, Cyanoethyl Aethe, Cyanoethyl Cellulose, dimethyl formamide diluent agent. The titanic coupling agent is added into the electroluminescent colloid, and the weight of the titanic coupling agent is 5% of the weight of the electroluminescent powder. The weight ratio of the electroluminescent powder and the electroluminescent colloid is 1:2. The luminous layer after coating is light yellow, and solidifies below 110° C. The transparent conductive layer 5 is an ATO compound and ethanol. The weight ratio of the ATO compound and ethanol is 100:10. The conductive layer solidifies below 100° C. after coating on the luminous layer. The outer protective conductive wire 10 is Ag. The plastic layer 6 is colorless transparent fluoroplastics made by the plastic extruding machine. The outermost layer is colorless and transparent PVC accompanied with a nickel-clad copper wire. The plastic extruding machine produces the outer protective layers. The total thickness of the electroluminescent wire is 8 mm to 10 mm.

The above electroluminescent wire emits red light when applied 110 V voltage of 2000 Hz frequency.

The Preferred Embodiment 3

A continuous base line made of copper wire with the diameter of 0.3 mm. The surface of the base wire is plated with metal modified layer 2 made of Sn. The metal modified layer is evenly coated with the dielectric layer 3 made of a compound of the dielectric powder and dielectric colloid, wherein the dielectric powder is 2:1 compound of barium titanate and strontium titanate, and the dielectric colloid are epoxy resin, Cyanoethyl Sugar, Cyanoethyl Cellulose and dimethyl formamide diluent agent. The coupling agent of silane that is 10% of the electroluminescent powder by weight is added into the dielectric colloid. The weight ratio of the dielectric powder and the dielectric colloid is 1:1. The dielectric layer after coating solidifies below 110° C., and the thickness of the dielectric layer is less than 1 mm. The dielectric layer 3 is coated with luminous layer 4, which is a compound of the electroluminescent powder and the electroluminescent colloid. The electroluminescent powder is green ZnS:Cu added with YAG. The weight of YAG is 10% the weight of the electroluminescent powder. The electroluminescent colloid is a compound of the epoxy resin, ethlenediamine solidified agent, Cyanoethyl Sugar, Cyanoethyl Aethe, Cyanoethyl Cellulose, dimethyl formamide diluent agent. The silane coupling agent is added into the electroluminescent colloid, and the weight of the silane coupling agent is 15% of the weight of the electroluminescent powder. The weight ratio of the electroluminescent powder and the electroluminescent colloid is 1:2. The luminous layer after coating solidifies below 110° C. The transparent conductive layer 5 is an ATO compound and ethanol. The weight ratio of the ATO compound and ethanol is 100:5. The conductive layer solidifies below 100° C. after coating on the luminous layer. The outer protective conductive wire 10 is Al plated with a metal modified layer. The plastic layer 6 is colorless transparent fluoroplastics made by the plastic extruding machine. The outermost layer is PVC added with 0.5% fluorescent blue dye, and accompanied with a wire plated with Al of 0.5 mm diameter. The plastic extruding machine produces the outer blue protective layers. The total thickness of the electroluminescent wire is 5.0 mm to 7.0 mm.

The above electroluminescent wire emits white light when applied 130 V voltage of 2000 Hz frequency.

The Preferred Embodiment 4

A continuous base wire 1 made of copper wire with the diameter of 0.5 mm. The surface of the base wire is plated with metal modified layer 2 made of Sn. The metal modified layer is evenly coated with the dielectric layer 3 made of a compound of the dielectric powder and dielectric colloid, wherein the dielectric powder is barium titanate, and the dielectric colloid are epoxy resin, Cyanoethyl Sugar, Cyanoethyl Cellulose, and dimethyl formamide diluent agent. The coupling agent of titanic that is 5% of the electroluminescent powder by weight is added into the dielectric colloid. The weight ratio of the dielectric powder and the dielectric colloid is 1:1. The dielectric layer after coating solidifies below 110° C., and the thickness of the dielectric layer is less than 0.2 mm. The dielectric layer 3 is coated with luminous layer 4, which is a compound of the electroluminescent powder and the electroluminescent colloid. The electroluminescent powder is blue-green ZnS:Cu added with YAG. The weight of YAG is 5% the weight of the electroluminescent powder. The electroluminescent colloid is a compound of the epoxy resin, ethlenediamine solidified agent, Cyanoethyl Sugar, Cyanoethyl Aethe, Cyanoethyl Cellulose, dimethyl formamide diluent agent. The silane as coupling agent is added into the electroluminescent colloid, and the weight of the silane is 10% of the weight of the electroluminescent powder. The weight ratio of the electroluminescent powder and the electroluminescent colloid is 1:2. The luminous layer after coating solidifies below 110° C. The transparent conductive layer 5 is an ATO compound and ethanol. The weight ratio of the ATO compound and ethanol is 100:5. The conductive layer solidifies below 100° C. after coating on the luminous layer. The outer protective conductive wires 10 is copper wire of 0.1 mm diameter plated with a metal modified layer made of Sn. The plastic layer 6 is colorless transparent fluoroplastics made by plastic extruding machine. The outer layer of plastic layer 6 is PVC layer 7 added with 0.3% fluorescent red dye, and accompanied with an iron wire 11 of 1 mm diameter plated with Zn. The plastic layer 8 is added with ultraviolet screening agent. The plastic layer 9 is added with scattering agent. The total thickness of the electroluminescent wire is 5.0 mm to 7.0 mm.

The above electroluminescent wire emits blue light when applied 90 V voltage of 2000 Hz frequency.

The Preferred Embodiment 5

A continuous base wire 1 made of copper wire with the diameter of 0.5 mm. The surface of the base wire is plated with metal modified layer 2 made of Sn. The metal modified layer is evenly coated with the dielectric layer 3 made of a compound of the dielectric powder and dielectric colloid, wherein the dielectric powder is $TiO_2$, and the dielectric colloid are epoxy resin, Cyanoethyl Sugar, Cyanoethyl Cellulose, and dimethyl formamide diluent agent. The coupling agent of silane that is 20% of the electroluminescent powder by weight is added into the dielectric colloid. The weight ratio of the dielectric powder and the dielectric colloid is 1:1. The dielectric layer after coating solidifies below 110° C., and the thickness of the dielectric layer is less than 1 mm. The dielectric layer 3 is coated with luminous layer 4, which is a compound of the electroluminescent powder and the electroluminescent colloid. The electroluminescent powder is blue-green ZnS:Cu added with YAG. The weight of YAG is 5% the weight of the electroluminescent powder. The electroluminescent colloid is a compound of the epoxy resin, ethlenediamine solidified agent, Cyanoethyl Sugar, Cyanoethyl Aethe, Cyanoethyl Cellulose, dimethyl formamide diluent agent. The silane as coupling agent is added into the electroluminescent colloid, and the weight of the silane is 12% of the weight of the electroluminescent powder. The weight ratio of the electroluminescent powder and the electroluminescent colloid is 1:2. The luminous layer after coating solidifies below 110° C. The transparent conductive layer 5 is an ATO compound and ethanol. The weight ratio of the ATO compound and ethanol is 100:3. The conductive layer solidifies below 110° C. after coating on the luminous layer. The outer protective conductive wires 10 is plated with a metal modified layer made of Sn. The plastic layer 6 is colorless transparent fluoroplastics made by plastic extruding machine. The outer layer of plastic layer 6 is colorless and transparent PVC layer 7 accompanied with an iron wire plated with Zn. Wire protruding machine finish the outermost colorless transparent protective layer. The total thickness of the electroluminescent wire is 5.0 mm to 7.0 mm.

The above electroluminescent wire emits green light when applied 130 V voltage of 2000 Hz frequency.

After the preferred embodiments are listed, one skilled in art should understand that any change or improvement without departure from the spirit and principle is still in the scope of the present invention.

What is claimed is:

1. An electroluminescent wire, comprising:
    a continuous base line;
    a metal layer coating onto said base line;
    a dielectric layer coating onto said metal layer;
    an luminous layer, comprising an electroluminescent phosphors and a YAG phosphors layer, coating onto said dielectric layer;
    an ATO transparent conductive layer coating onto the luminous layer;
    a protective conductive wire connected with the ATO transparent conductive layer;
    a fluoroplastic layer for sealing said ATO transparent conductive layer and protective conductive wire; and
    an outermost layer for encasing said fluoroplastic layer,
    wherein said fluoroplastic layer is transparent and said outermost layer is a plurality of transparent or translucent colorized plastic tubes; wherein at least one of said colorized plastic tubes is embedded with a metal wire having certain rigidity, wherein the metal wire is outside of the fluoroplastic layer.

2. The electroluminescent wire, as recited in claim 1, wherein glass microballs are added into at least one of said colorized plastic tubes for improving visual luminescent intensity.

* * * * *